United States Patent [19]

Nordstrom

[11] 4,360,098
[45] Nov. 23, 1982

[54] INFEED CONVEYOR

[75] Inventor: John E. Nordstrom, Two Rivers, Wis.

[73] Assignee: Barbara Ann Nordstrom, Two Rivers, Wis. ; a part interest

[21] Appl. No.: 820,053

[22] Filed: Jul. 29, 1977

[51] Int. Cl.³ ............................................. B65G 47/26
[52] U.S. Cl. ................................... 198/419; 198/425; 198/460; 198/572; 198/575; 198/577; 198/579; 198/444; 198/451; 198/452
[58] Field of Search ........................ 198/425, 459–461, 198/464–466, 468–470, 502, 571, 572, 575–577, 579, 857, 444, 448, 451, 452, 420, 419; 250/223 R, 224; 53/59 R, 159, 493, 495, 543

[56] References Cited

U.S. PATENT DOCUMENTS

| | | | |
|---|---|---|---|
| 3,081,863 | 3/1963 | Monohan | 198/460 |
| 3,155,221 | 11/1964 | Griner | 198/425 |
| 3,458,026 | 7/1969 | Lauzon et al. | 198/460 |
| 3,827,545 | 8/1974 | Buhayar | 198/461 |
| 3,938,650 | 2/1976 | Holt | 198/425 |

FOREIGN PATENT DOCUMENTS

1288017  1/1969  Fed. Rep. of Germany ...... 198/577

*Primary Examiner*—Joseph E. Valenza
*Attorney, Agent, or Firm*—Wheeler, House, Fuller & Hohenfeldt

[57] ABSTRACT

Products, accumulated on a supply conveyor having low-friction belts, are transferred to a flight conveyor with an intervening single level infeed conveyor system which includes a high-friction belt squeezer conveyor that accepts products at its inlet end from the supply conveyor and releases them for synchronous arrival in the flight conveyor. Means are provided for keeping the squeezer conveyor filled with a column of abutting products at all times during a production run so there is no speed change and, hence, no abrasion of products as they advance from the low-friction supply conveyor to the squeezer conveyor inlet. Means are provided for: starting the squeezer conveyor to release the first product at a time when synchronous arrival at the flight conveyor is assured; for stopping the squeezer conveyor while still full of products in response to the supply being temporarily exhausted; and, for increasing or decreasing the speed of the squeezer conveyor in accordance with whether the product in transit is developing a position error which would, respectively, make it too late or too early for synchronous arrival. Products released from the squeezer are transported by a speedup conveyor and for applications where products are grouped, a cyclically variable speed transition conveyor is interposed between the squeezer and speedup conveyors. Coordinated dual lane infeed conveyor systems are also disclosed.

23 Claims, 11 Drawing Figures

INFEED CONVEYOR

BACKGROUND OF THE INVENTION

This invention relates to an infeed conveyor system for separating articles unit by unit or in groups of units. The new infeed conveyor system is illustrated herein in a special adaptation for separating rolls of bathroom tissue (BRT) and household paper towel (HHT) rolls from a nominally continuous supply of rolls preliminary to feeding them in units or groups to a wrapping machine.

Because of their delicacy, paper rolls are highly susceptible to being scuffed and to being dented or deformed as they transit an infeed conveyor system. Some prior infeed systems feed paper rolls singly or in groups from a first supply conveyor, where they are stationary or moving at a certain speed, to second conveyor on which they experience marked acceleration or deceleration. The feed from supply is customarily intermittent. The second conveyor usually has abrasive surfaces for developing the friction which is desirable to transport the rolls effectively. But, undesirably when the rolls undergo a speed change, relative motion between the rolls and the abrasive surfaces causes scuffing.

Squeezer conveyors are preferred for advancing rolls from a supply to a place where they are separated as units or in groups of two or four which is common for HHT and BRT. Squeezer conveyors are comprised of two spaced apart parallel belt loops between which a column of rolls fits snugly so that when the belts are translated, frictional engagement of the belts on the rolls will transport them along the belts. When operated in their prior art mode, they do impart a speed change to the rolls and scuffing results. In practice, the supply of rolls is interrupted occasionally in which case the squeezer conveyor may discharge all or many of its rolls, thus leaving no rolls between the belts or a gap between the last roll in the remainder of the column and the input end of the belts. Then when the supply is restored and the conveyor is started again the abrasive action and scuffing occurs because of the speed change as the rolls are fed in.

Another characteristic of infeed conveyors is that the separated rolls must be delivered from a separating device adjacent the output of a squeezer or other type of conveyor so they arrive in proper phase relationship with moving elements in receiving apparatus such as a bucket wheel, flight conveyor or elevator which transports roll units or groups to a wrapping machine. Generally, the rolls are gated intermittently at regular intervals and all parts of the machine are driven from a common source in an effort to maintain synchronism, that is, to establish a fixed time for rolls to travel from the gate to the receiving apparatus. Undesirably low speed and reduced productivity are consequences of operating in this mode.

U.S. Pat. No. 3,823,813 discloses a prior roll unit and group forming machine. It has a conventional supply conveyor belt 12 which delivers product, when available, to a gate 14 which is opened and closed cyclically with a fluid operated cylinder 156. The cylinder is switched on and off with a relay operated valve under the control of a cam driven switch 146. The cam is driven from the main shaft of the machine for synchronizing purposes. Product is cyclically gated onto an accelerating conveyor belt 30 which is driven at a uniform speed through a main shaft connection. The accelerating belt advances the product quickly away from the gate and into spaced apart guides or plates 50 and 52 which are aimed toward a flight conveyor which transports the rolls to a wrapping machine. The rolls are pushed along the guides with pusher bars that are carried on a chain and sweep endwise through the spaces between the guide plates. Some pressure rolls which cooperate with the accelerating belt conveyor, the accelerating belt, the pusher bar drive mechanism and the flight conveyor are all mechanically interconnected in an effort to maintain synchronism, that is, to assure that a fixed time will elapse between opening of the gate and arrival of the product at the proper time in the flight conveyor.

One of the disadvantages of a machine of the type shown in the patent is that gates 14 open and close every machine cycle to release product from the supply conveyor to the accelerating conveyor. Hence, the leading product on the supply conveyor and a backlog of product, which may extend 20 to 30 feet behind it, move while the gate is open and stop abruptly when the gate closes. The inertia of the backlog and the return force of the closing gate can deform or dent the lead roll at least.

As is evident, product flow from the supply to the accelerating conveyor is not continuous. The accelerating conveyor belt 30 and the cooperating pressure rolls in the prior machine are driven at a high lineal speed and the rolls have low speed because they are stopped prior to opening of the gate. They then undergo an abrupt increase in speed which can cause scuffing. In addition, limitations on practical gate operating speeds limit the speed of the entire machine to a relatively low speed.

If two lanes of product are being controlled by one gate for grouping pairs of products, one lane will inevitably run out of product, while the other presses against the gate. Lack of product in one lane would require the other gate to be held closed as long as the lack existed or incomplete groups of products would result. When product becomes available again, additional scuffing could take place as the gate moved to the side. No means of dealing with such problems is apparent in the patent.

As will be seen, in accordance with the present invention, flow from the supply conveyor to an accelerating conveyor is continuous by reason of interposing a variable speed high friction squeezer conveyor between these conveyors. When rolls are fed from two lanes and the supply in one becomes exhausted, both squeezer conveyors stop while still full of products. When product is restored, it strikes no gate but merely bumps into a soft roll which was left in the squeezer when it stopped. The new supply of products is brought to a stop only on a low friction supply conveyor by contact with prior products.

Gates, as in the prior patent, are operated with air cylinders having cams controlled by an air valve operated by a timing cam. If machine speed varies, timing of the gate must be changed to compensate for the cylinder operating at constant speed independently of machine speed. There is always a lag between opening of the cylinder valve by the timing cam and the time at which the gate should open. It is difficult to adjust for this variable. Repeatability and maintenance of synchronism is problematical with air operated devices at high machine cycling speeds so the machine may have to be run slower and lower productivity results.

Intermittently operated mechanisms such as the gates and air cylinders in prior machines cause vibration and noise which, it will appear, are obviated by the new continuous flow machine described herein.

SUMMARY OF THE INVENTION

An object of this invention is to provide a machine, called an infeed conveyor system, characterized by improved speed of separating rolls from a supply of rolls.

Another object is to provide for advancing rolls from an input or supply conveyor to and through a squeezer conveyor and to an accelerating or separating conveyor without any gaps being allowed to develop between the rolls in the squeezer conveyor at any time during normal operation.

Another object is to provide a product unit or group separating machine which advances the units or groups in a continuous mode of operation as opposed to intermittent operation.

Still another object is to provide an infeed conveyor system or machine which is versatile in that it will accommodate roll products of different sizes and in different groupings and which is easily adapted to cooperate with a similar machine for enlarging the number of units in a group or diminishing the number, as desired.

Another object is to provide for modulating or increasing and decreasing the speed of the squeezer conveyor, as required during operation, to correct for any possible minor loss of phasing between the squeezer conveyor and receiver-transport conveyor, to thereby continuously correct for product size and position variations, all without starting or stopping any of the conveyors in the system.

Another object is to provide an infeed conveyor system in which starting and stopping, product direction changes, substantial product compression or deformation, rough handling and scuffing are completely avoided.

Still another object is to sense any interruption in the supply of rolls on the supply conveyor and to provide means which respond to a lack of supply by stopping the squeezer conveyor while at least its input end is occupied by a roll which has not gone into the squeezer completely so that when the supply is restored the new product will be advanced to abut the last of the old product without any gap being formed in the squeezer conveyor.

Another object is to provide an infeed conveyor system in which the product stays at the same level during the entire operation of taking products from a supply and separating them into units or groups and placing them on a receiving apparatus.

Yet another object is to provide for operating a plurality of infeed conveyor lanes in unison and in proper synchronism such that the product output rate will be maximized.

Briefly stated, an illustrative embodiment of the new infeed conveyor system comprises a product or roll supply conveyor which has low friction or slippery belt surfaces. A squeezer conveyor is arranged in series with the supply conveyor. The squeezer conveyor comprises a pair of relatively high friction linearly moving conveyor belts which are parallel and have their confronting faces spaced from each other to define a passage, having input and output ends, through which rolls are advanced under slight compressive force. During normal operation, the squeezer conveyor runs at a nominally constant speed but it is automatically speed modulated to correct for phase or synchronism errors on a substantially continual basis.

In machines that are set up for grouping products, a transition conveyor receives the products from a squeezer conveyor. The transition conveyor belts are translated at a cyclically varying speed so that one product will advance rapidly away at high speed to make room for the next product released from the squeezer conveyor while the transition conveyor is at low speed.

A speedup or accelerating conveyor is located at the output end of the squeezer conveyor or at the output end of the transition conveyor when used. It is operative to advance product at high speed after the product is discharged from the squeezer to thereby effect spatial separation of product units or groups of units.

Means are provided for assuring that a product will only be discharged from the output end of the squeezer conveyor at a time for it to arrive in perfect synchronism in the product receiver conveyor.

Means are also provided to automatically sense the absence of product on the supply conveyor adjacent the input end of the squeezer conveyor and means are provided for responding to this condition being sensed by stopping the squeezer conveyor while the trailing product still extends partially from its input end.

How the above mentioned and other more specific objects of the invention are achieved will be evident in the ensuing more detailed description of illustrative embodiments of the invention will now be set forth in reference to the drawings.

DESCRIPTION OF A PREFERRED EMBODIMENT

Figure 1:
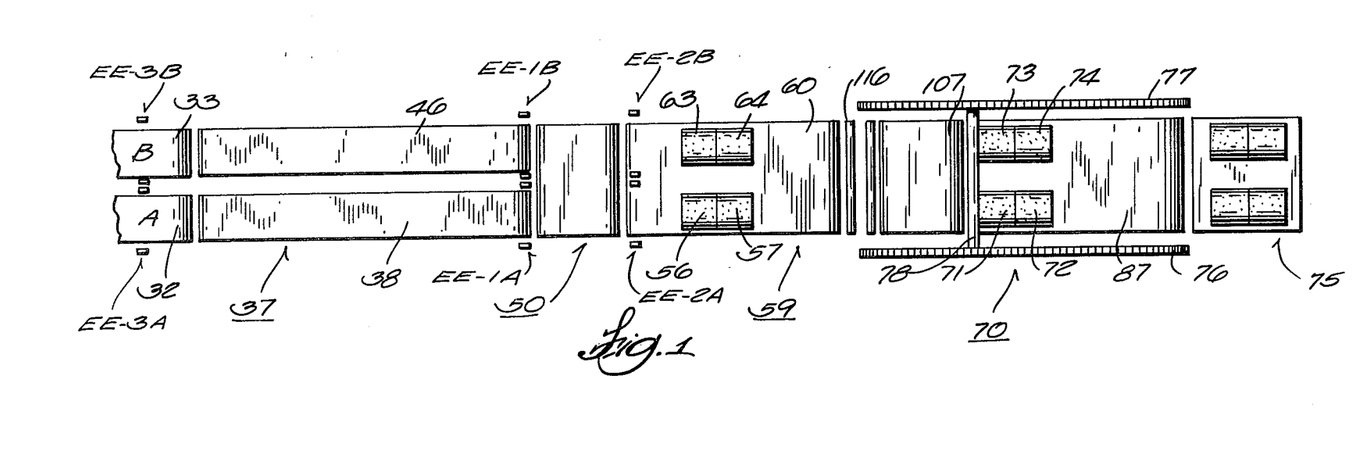
FIG. 1 is a plan view of one embodiment of the new infeed system.
Figure 2:
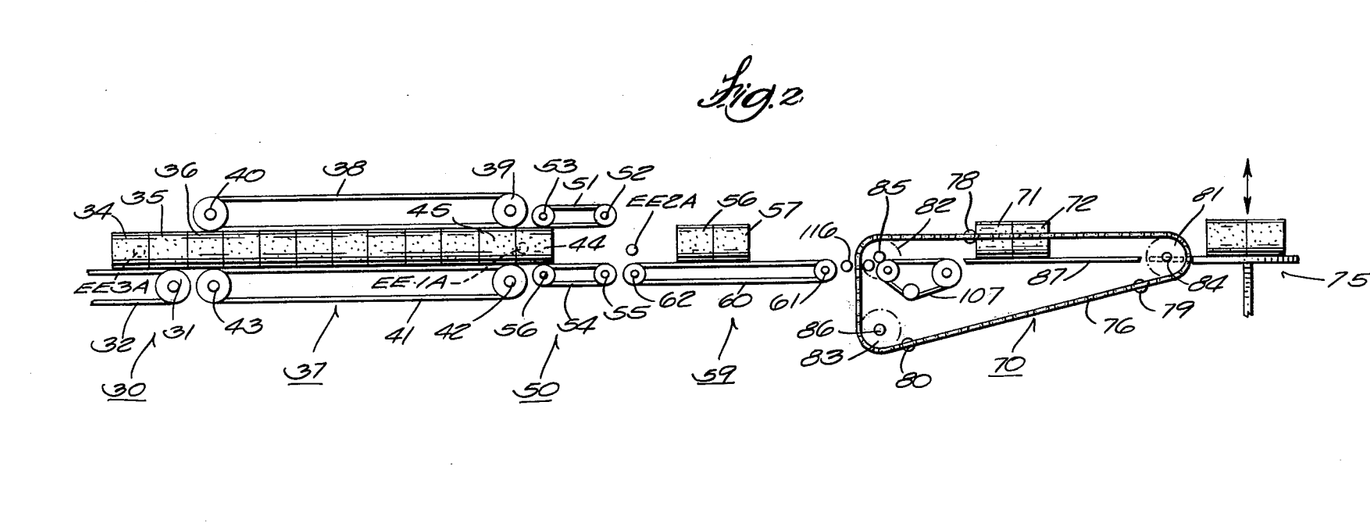
FIG. 2 is a side elevational view of the apparatus in FIG. 1.

Referring to FIGS. 1 and 2, at the far left, the supply conveyor is designated by the reference numeral 30. One of its rollers 31 is shown and the other has been omitted. A closed loop belt 32 runs on roller 31 and its counterpart. The outside surfaces of belt 32 are coated with a low friction material such as Teflon. Rolls of toilet paper or household toweling, for example, are transported from a machine, not shown, which cuts the rolls into the desired lengths. As can be seen in FIG. 1, the machine may have two lanes, one starting with supply conveyor belt 32 and the other starting with supply conveyor belt 33.

In FIG. 2, two bathroom tissue or BRT rolls 34 and 35 are shown lying with their axes horizontal on typical supply conveyor belt 32. Roll 35 is abutting against a roll 36 which has departed from the supply conveyor and is within the grip of a squeezer conveyor which is generally designated by the reference numeral 37. During normal operation, it will be understood, that there are a long series of rolls such as 34 and 35 resting on supply conveyor belt 32 which is turning under the rolls without abrasion because of the slippery coating on conveyor belt 32. The axes of the paper tubes on which paper rolls such as 34–36 are formed are horizontal or parallel to the planes of the conveyor belts.

Squeezer conveyor 37 comprises an upper belt loop 38 which runs on a driven roller 39 and an idler roller 40. The squeezer conveyor further comprises a lower belt loop 41 which runs on a driven roller or pulley 42 and an idler pulley 43. The manner in which pulleys 39 and 42 are driven in unison will be discussed later. The outer surfaces of belts 38 and 41 are preferably made of or coated with a material which is abrasive and exhibits high friction relative to the paper rolls which are slightly squeezed between the lower run of upper belt 38 and the upper run of lower belt 41. As shown in FIG. 2, the passageway defined by upper and lower belts 38 and 41 is fully occupied by a column of paper rolls extending from trailing roll 36 to leading rolls 44 and 45. The translational direction of belts 38 and 41 is such that the roll product is transported from left to right in FIG. 2.

In FIG. 1, the lane which includes supply belt 32 and squeezer conveyor belt 38 will be called lane A and the lane which includes supply conveyor belt 33 and squeezer conveyor belt 46 will be referred to as lane B.

In the FIG. 1 and FIG. 2 embodiment, there is a transition conveyor which is generally designated by the reference numeral 50. It comprises an upper belt loop 51 made of high friction material running over a driven pulley 52 and an idler pulley 53. It also has a similar lower belt loop 54 running on a driven pulley 55 and an idler pulley 56. Transition belts 51 and 54 are driven in such direction as to advance the product from left to right as viewed in FIG. 2. The drive mechanism coupled with pulleys 52 and 55 will be explained later. Transition conveyor belts 51 and 54 are driven epicyclically in a mode wherein the belts are driven at alternate high and low speeds. A first product 44 moves onto transition conveyor 50 at a time when the speed of the transition conveyor is faster than the speed of the squeezer conveyor. By the time the next product 45 moves onto the transition conveyor 50 its speed has been reduced to less than that of the squeezer so the products 44 and 45 form a group. The speed then increases to carry the group out of contact or separated from the next product. In this manner, lead products 44 and 45 are combined into a group of two which abut each other. A pair of products or paper rolls which have been placed in abutting relationship resulting from the preceding speed cycle of the transition belts are shown on the next adjacent conveyor and are marked 56 and 57. The average speed of the transition conveyor is between that of the squeezer and the speedup conveyor 59 which will be described soon.

Transition conveyor 50 is wide enough to accommodate rolls from lanes A and B in FIG. 1.

Adjacent transition conveyor 50 in FIG. 2 is a speedup or accelerating conveyor which is generally designated by the reference numeral 59. It comprises a belt 60 running on a driven pulley 61 and an idler pulley 62. At least the outer surfaces of belt 60 should have high friction qualities to assure positive transport of products such as abutting rolls 56 and 57. The drive mechanism for speedup conveyor 59 will be described later. As can be seen in FIG. 1, speedup conveyor belt 60 is wide enough to accommodate groups of abutting rolls 63 and 64 which have emerged from transition conveyor 58.

Adjacent speedup conveyor 59 is a flight conveyor which is generally designated by the reference numeral 70. Product units or groups of units are advanced from the speedup conveyor belt 60 to the flight conveyor 70 for the purpose of finally moving products such as 71, 72 and 73, 74 to a wrapping machine elevator 75 or similar timed device. The product elevator may cooperate with a known type of product wrapping machine, not shown. The flight conveyor comprises a pair of timing belt loops 76 and 77 which are spanned by pusher rods such as those marked 78, 79 and 80. Typical belt 76 runs on three pulleys 81, 82 and 83. These pulleys are, respectively, on parallel cross shafts 84, 85 and 86. At the remote ends of these shafts, as viewed in FIG. 2, there are pulleys corresponding with 81, 82 and 83 on which belt 77 runs. It will be evident that as the upper span of belt 76 translates to the right, pusher bar 78 will push products such as rolls 71–74 along a supporting base plate 87 and onto wrapping machine elevator 75. The wrapping machine has timed means into which the product may be pushed into it.

Before getting into a detailed discussion of how the various conveyor are driven, some of the broad functional features of the system will be summarized. As mentioned earlier, one of the features is to have rolls, such as BRT and HHT rolls, completely fill the squeezer conveyor 37 so the rolls will not be scuffed when they leave the supply conveyor 30 and enter the high friction squeezer conveyor 37. Another feature is to always have sufficient rolls available together at the input end of the squeezer belt to avoid having the squeezer belt stop from lack of product with the last roll far enough into the squeezer conveyor to allow scuffing of the first subsequent roll when product supply is resumed.

For achieving these and other purposes, three photoelectric relay devices are used. In FIG. 2, they are marked, respectively, EE1, EE2 and EE3. These are commercially available electric eye devices or detectors and they will sometimes be referred to as electric eyes for convenience. They are shown symbolically. Each of them comprises a small concentrated light source surrounded by a photosensitive semiconductor device although other types of non-contacting detectors could also be used. For monitoring flow or position of products, paper rolls in this case, they are arranged for projecting a light beam from one side of the flow path to a reflector on the other side which reflects light back to the photosensitive element. The photosensitive element produces high or low electric signals depending, respectively, on whether light is being reflected back or the light beam is interrupted. All of the electric eyes referred to in this description are aimed across the product flow path at an angle to eliminate possible false signals due to small gaps between the products. A gap must be big enough for the angularly directed beam to pass for the electric eyes to sense a gap.

EE3 is called the backlog eye for convenience in the present system. It is involved in stopping squeezer conveyor 37 when there is no roll interrupting its beam. EE3 is located more than one roll length before the beginning of the squeezer conveyor input. For instance, in FIG. 2, one full product 35 and part of rolls 34 and 36 intervene between EE3 and the input end of the squeezer conveyor. The conveyor system will not run unless the squeezer conveyor belts and the supply conveyor belt 32 have sufficient rolls on them to create this condition. As a result, the squeezer conveyor is always completely filled and at least the trailing roll 36 will extend just slightly out of the squeezer conveyor when the system is stopped as would be the case when there is no input of new product on the supply conveyor 30. EE3 is involved in the control circuitry, which will be discussed later, in such manner that when product supply is restored, there will be a small time delay before the squeezer conveyor 37 is started. Supply rolls are thus accumulated before they are removed by the squeezer conveyor so the stream of rolls or whatever product is being separated is continuous.

It is important to note that when squeezer conveyor 37 is operating, the next consecutive roll 35 to be fed in will advance into the squeezer conveyor at the same velocity at which the rolls which are already in it are traveling. This is so because rolls such as 34 and 35 have the slippery supply conveyor belt 32 operating under them so the rolls abutting those in the squeezer conveyor can travel at lower speed than the supply conveyor without becoming scuffed. Thus, as trailing roll 36 moves into the squeezer conveyor, the next roll 35 and succeeding rolls simply follow the trailing roll at the same velocity so there is no relative movement between the rolls and the high friction squeezer conveyor belts 33 and 41 in which case scuffing of the rolls is avoided.

Another of the electric eyes, EE1, is called the flow-start eye and is used only to start the machine under empty conditions, for instance, at the beginning of a production run. EE1 lets the first rolls through at a time when the separated rolls will be synchronized with the flight conveyor 70 which transports the rolls away from the output end of the input conveyor system which includes conveyors 30, 37, 50 and 59. Deferring description of the actual structure for the moment, it will be understood that there is a cam that is driven by the main shaft or common power source which basically drives the whole input conveyor system and is therefore synchronized with the flight conveyor. This cam operates a switch which enables flow-start eye EE1. If EE1 senses a roll in the squeezer conveyor, such as roll 44, during the time when the switch is turned on, squeezer conveyor 37 can start. After the squeezer conveyor has been filled, EE1 is no longer involved because, with the squeezer conveyor filled with products initially positioned by function of the flow-start eye EE1, all subsequent rolls will be positioned the same way because they abut rolls previously placed in squeezer conveyor 59. The function is such that the squeezer conveyor is not allowed to become empty during a production run. Product position errors due to variations in roll lengths are corrected with a subsystem under the control of a modulation electric eye which, as will be described, effects minor changes in squeezer conveyor speed to correct cumulative errors in synchronization of the system. This is preferable to starting and stopping product flow because correction is fast and results in no significant acceleration or deceleration which could abrade or otherwise damage the product.

Continuing with the general discussion without identifying all of the parts, another electric eye EE2, just referred to as the modulation eye, is used to regulate the speed of the squeezer conveyor 37 slightly above or below its mean or average speed to compensate for variations in the length of the rolls. A plus or minus 5% speed variation is satisfactory in practice. Rolls of a given nominal length have small variations which may accumulate sufficiently to destroy synchronization or proper phasing of the various sections of the machine. Modulation eye EE2 is involved in restoring synchronization so that the single roll or groups of rolls arrives at the flight conveyor at the output end of the input conveyor system in proper phase. As will appear, two timer cams, which must remain in synchronism because they are run from a common main drive shaft of the machine, are each arranged to turn on a switch to enable EE2 at narrowly spaced intervals whenever a flight or pusher bar 78–80 of flight conveyor 70 is at an appropriate location for insertion of the rolls into the flight conveyor. Eye EE2 is at a position to sense the trailing edge of a roll when it is enabled. If the first switch is closed by the leading cam when EE2 means that the trailing or back face of the roll has passed, the speed of the squeezer conveyor is increased. If the second switch is closed by the trailing cam at the time eye EE2 detects a space because the end of the roll has passed, the speed of the squeezer conveyor is decreased. Thus, the squeezer conveyor never actually runs at its nominal speed but is running either slightly above or slightly below that speed. It oscillates back and forth between its two speeds. The space between the flight bars 78–80 of conveyor 70 is adequate for allowing the cycling if the speed range of the squeezer conveyor is properly chosen.

Transition belt conveyor 50 takes rolls from the squeezer conveyor 37. In the FIG. 2 embodiment, transition belts 51 and 54 are driven in such manner that they speed up and slow down once in each cycle in order to keep two rolls abutting after they have been separated from the continuous column of rolls in the squeezer conveyor. If two rolls such as 56 and 57 are to be in a group, 57 would have been in the position of roll 44 at the time that transition belts 51 and 54 are at their highest linear velocity. As the lead roll 57 advances, the belts slow down so that the next roll in the group, 56, is deposited on the transition belt in abutting relation to roll 57. The mean speed or average speed of the transition conveyor belts 51 and 54 is between the speed of the squeezer conveyor belts 38 and 41 and the speed of the speedup conveyor 59. Various means may be used for cyclically speeding up and slowing down of the transition conveyor 50. Various types of gearing such as epicyclic gearing systems may be used which change from a higher to a lower speed in each operating cycle, or electronic controls may be used.

As the first roll of each group enters the transition belt conveyor 50, its belts are traveling at their highest speed. The belts then slow down as the drive goes through its cyclic change. The result is that the next roll fed onto the transition belt remains abutting the first roll. The transition belt is speeding up again as the last roll of a group is transferred to the speedup conveyor 59. Again, the result is to keep all of the rolls in a group abutting each other. At the same time, the first roll of the next group is just entering the transition belt conveyor to go through the same process. The length of the transition belt conveyor and the amount of speed change above and below the average speed of the transition belt can be varied, by means which will be described, to account for different numbers of rolls which are to be grouped for wrapping in a single package. It should be noted that if only a single roll or other article was fed in each cycle, the transition belt conveyor 50 may be driven at a constant speed which is higher than the speed of the squeezer conveyor 37 but lower than the speed of the speedup conveyor 59.

It should be noted that one function of the variable speed transition conveyor 50 is to prevent opening of spaces within a group of rolls. A space would be sensed by and would deceive the modulation eye EE2. If variable speed were not used, it would be necessary to provide extra electric circuits to prevent spurious signals from operating the modulation eye and changing the speed of squeezer conveyor 37. Moreover, extra operations would shorten the life of the modulation eye. The arrangement is such that the greatest tolerance is allowed in placement of rolls or other articles at the squeezer conveyor while still permitting the flights or pusher bars of the flight conveyor 70 to enter the consecutive gaps between roll groups while minimizing the number of adjustments to the speed of the squeezer conveyor.

Now that the functional features of the new infeed conveyor have been generally described, the more detailed description of the structure and drive systems will be continued.

Figure 3:
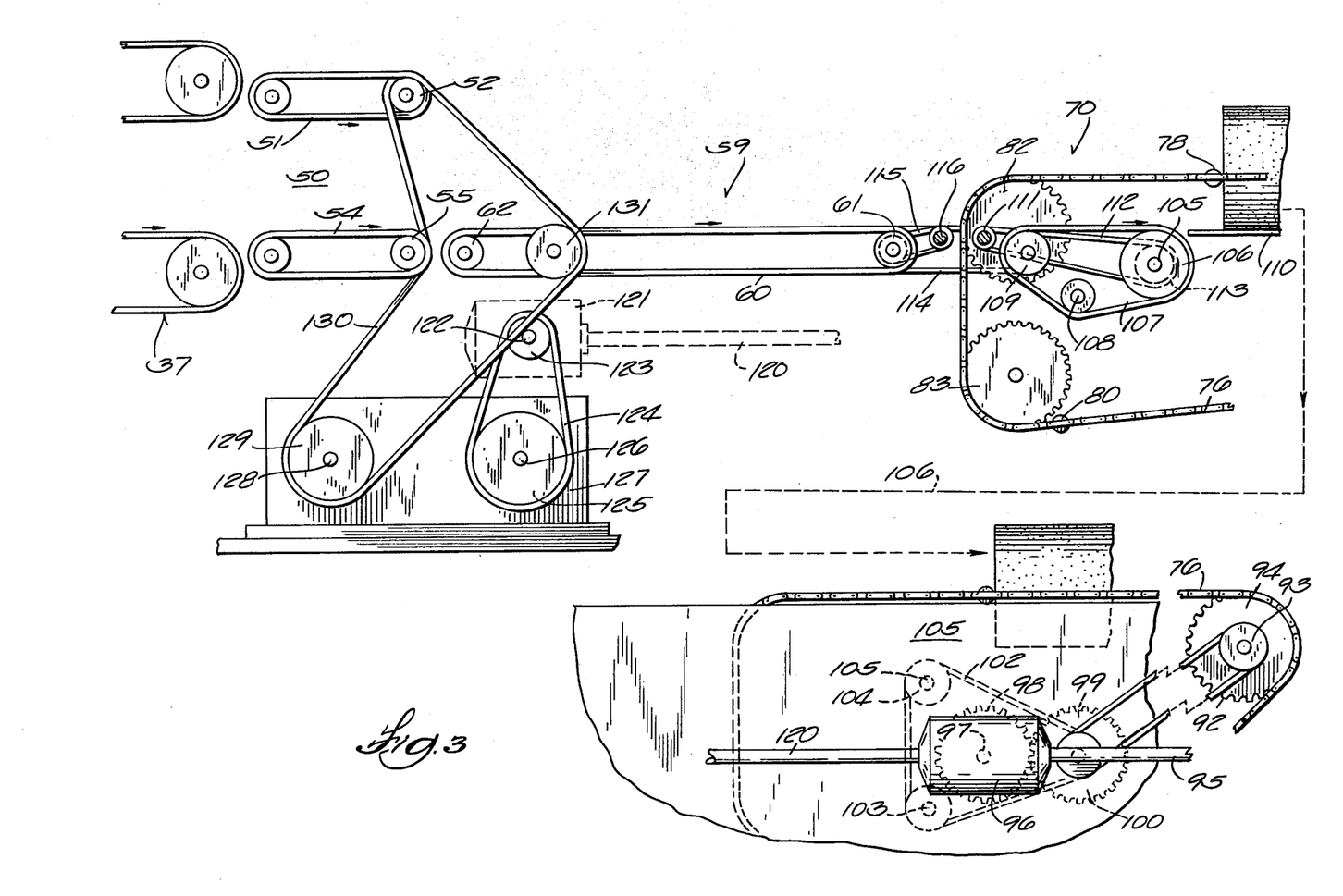
FIG. 3 is an isolated view of a fragment of the squeezer conveyor, an adjacent transition conveyor comprising a pair of parallel belts, an accelerating or speedup conveyor, a product receiver or flight conveyor and the driving mechanisms for the conveyors exclusive of the squeezer conveyor.

Refer to FIG. 3 where part of the drive system is shown. Basically, squeezer conveyor 37, transition conveyor 50, if used, speedup conveyor 59 and flight conveyor 70 are driven from the same shaft which drives the wrapping machine. This main shaft is shown broken away and marked 95 in FIG. 3. Shaft 95 goes into a 3-way drive mechanism 96. A shaft 97, shown in hidden lines, comes off of the back of mechanism 96. A gear 98 is fastened to shaft 97. It drives another gear 99 which is on a shaft 100 that is journaled, by means which are not shown, and is behind main shaft 95. Shaft 100 has two timing pulleys on it which are in alignment with each other. One of these pulleys drives a timing belt 92 running on a small pulley 93 which is on a common shaft with a large pulley 94. Pulley 94 engages and drives the flight conveyor belt 76. There is, of course, another pulley similar to 94 on the same shaft which is engaged with the other flight conveyor belt similar to belt 76 but these parts are congruent in FIG. 3 and are not visible.

Another of the pulleys on shaft 100 drives a belt 102 which further runs over an idler pulley 103 and a driven pulley 104. Pulley 104 is on a shaft 105. To avoid superposition of the parts thus far described and shown, various layers are isolated from each other in FIG. 3 and are related by the dashed line 106. For instance, flight conveyor drive belt 76 is shown in the lower right fragment and repeated in the upper right fragment. In any event, it will be understood that shaft 105 in the lower fragment is the same as a similarly numbered shaft 105 in the upper fragment. This shaft drives a pulley 106. A conveyor belt 107 runs on this pulley and on idler pulleys 108 and 109. Conveyor belt 107 is for crossing over the gap between speedup conveyor 59 and a bed plate 110 in the flight conveyor on which the product is supported at the time it is engaged by one of the flights such as 78. Further support for the roll products while in transport is obtained with another roller 111 which is driven by a belt 112 and a pulley 113 which is on shaft 105. Another belt 114 drives a pulley 61 for the speedup conveyor belt 60. Another small belt 115 drives another roller 116. Driven rollers 111 and 116 provide support for the rolls while they are in transit to the flight conveyor and they also provide a gap for enabling flight bars 78–80 to translate without interference.

The drive system for transition conveyor 50 will now be discussed. It is driven from a shaft 120 which extends from gear box or 3-way drive 96. Shaft 120 is shown in solid lines in one part of FIG. 3 and in hidden lines in another. Shaft 120 is the input shaft to a gear box 121 which changes the driving direction by 90°. An output shaft 122 extends from gear box 121. Shaft 122 has a pulley 123 on it for driving a belt 124. Belt 124 drives a pulley 125 which is on a shaft 126 constituting the power input shaft of an epicyclic drive mechanism which is within a housing 127. A power output shaft 128 also extends from the drive mechanism. It has a pulley 129 fastened to it. Epicyclic drive mechanisms are well known to those skilled in the mechanical arts and need not be described further except to say that it has the usual capability of cyclically varying the rotational rate of the output shaft 128 while the power input shaft 126 turns at a constant speed. The speeds involved are obtained by selecting gear sizes.

Output pulley 129 drives a belt 130 which is in driving relation with pulley 52 and pulley 55 on which transition conveyor belts 51 and 54 run. Belt 130 also runs over an idler pulley 131 which enables adjusting its tension by means which are not shown. By changing gears, the epicyclic gear mechanism is capable of being adjusted for different ratios between its input and output shaft speeds which permits the variable speeds of the transition conveyor belts 51 and 54 to be adjusted so they will advance rolls at a speed and distance that is appropriate for their length.

Figures 4, 5:
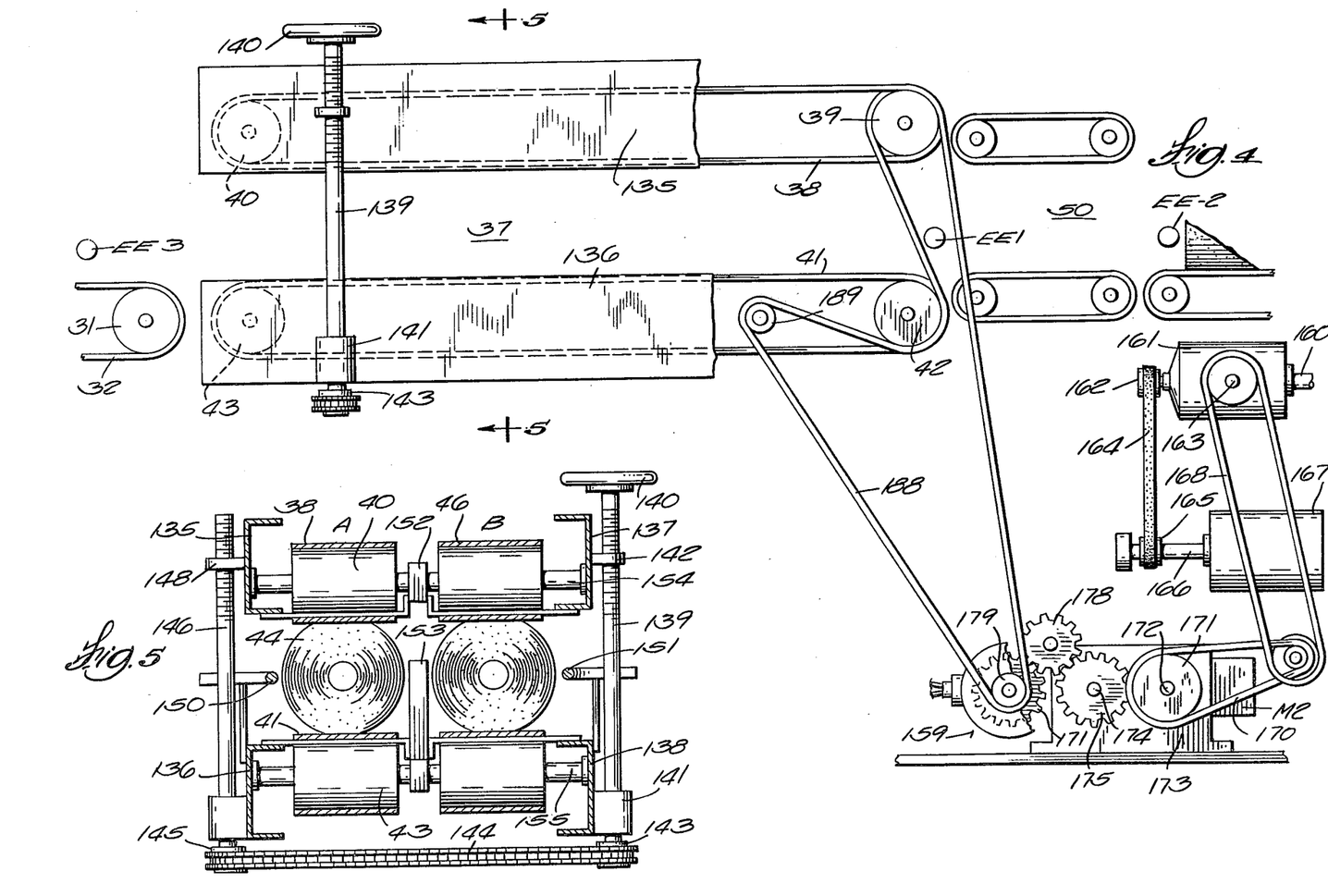
FIG. 4 shows a side elevational view, with parts broken away, of the squeezer conveyor together with its drive and modulating mechanism and the transition belt conveyor.
FIG. 5 is a vertical elevational view taken along a line corresponding with 5—5 in FIG. 4.

The squeezer conveyor construction and drive mechanism will now be discussed in reference to FIGS. 4 and 5 primarily. The shafts for the pulleys 39 and 40 for one belt of the squeezer conveyor are journaled in a member 135 which is part of the machine frame. Similarly, the shafts for the lower pair of pulleys 42 and 43 of the squeezer conveyor 37 are journaled in a frame member 136. As can be seen in FIG. 5, frame members 135 and 136 are channels and have counterparts, respectively, 137 and 138. A lead screw 139 having a handwheel 140 is provided for raising and lowering the upper belt 38 with respect to lower belt 41 to accommodate rolls of different diameters, such as roll 44, between the squeezer conveyor belts. Lead screw 139 is journaled in a bearing 141 which is fastened to channel 138. An internally threaded nut 142 is fastened to channel 137 so that when the lead screw is turned, depending on its rotational direction, channel 137 will raise and lower. Lead screw 139 has a sprocket 143 fastened to its lower end which drives a chain loop 144. Chain 144 runs on another sprocket 145 which is fastened to a lead screw 146. This lead screw also has a bearing 147 fastened to channel 136 and a follower or nut 148 fastened to channel 135. It will be evident that when lead screw 139 is turned by means of handwheel 40, similar rotation will be imparted to the lead screw 146 on the opposite side so that the upper belt comes up level. As can be seen in FIG. 5, the squeezer conveyor belts 38 and 41 are for the lane A conveyor and the lane B squeezer conveyor is also visible in FIG. 5.

In further reference to FIG. 5, note that adjustable guides 150 and 151 are provided to constrain the product rolls in their desired paths. Intermediate guides 152 and 153 are also provided for this purpose. Shafts 154 and 155 for the upper and lower squeezer conveyor belt pulleys 40 and 43 and their counterparts in lane B are also visible in FIG. 5.

The drive mechanism for the squeezer conveyor will now be described in reference to FIG. 4. Power is supplied from the wrapping machine main drive to power input shaft 160 which is shown fragmentarily. Shaft 160 drives a gear mechanism 161 which has an axial output shaft 162 and a right-angle output shaft 163. Shaft 162 has a pulley on it for driving a belt 164 which runs a pulley 165 that is on a shaft 166. Shaft 166 drives a cam switch mechanism which is symbolized by the block 167. Switches operated by the cams are designated LS-1, LS-2, LS-3 and LS-4. LS-4 is used for two-lane operation only. These cam operated switches will be described later in connection with FIGS. 9 and 10.

Figure 10:
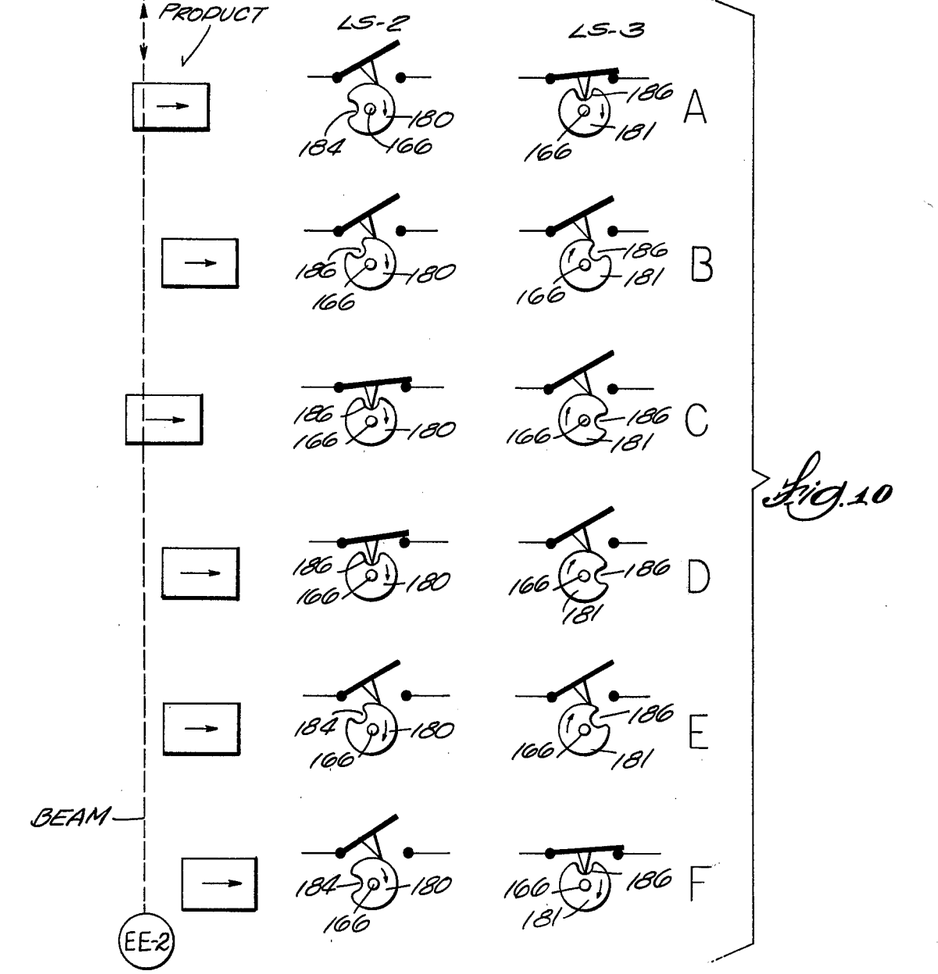
FIG. 10, composed of parts A–F; is for explaining modulation of the squeezer conveyor.

Two cam wheels 180 and 181 which are on the common shaft 166 are involved in modulating the squeezer belt speed and are shown in isolation in FIG. 10. Cam 180 has a notch 184 which registers with the follower of switch LS-2 to actuate the switch as the cam rotates. Cam 181 also has a notch 186 which similarly cooperates with switch LS-3. Further explanation of their function will be given later.

Returning to FIG. 4 to continue the description of the drive system for the squeezer conveyor, one may see that a belt 168 is provided for driving a sprocket on shaft 169. Another sprocket on this shaft drives a belt 170 which turns a pulley 171 fastened to the power input shaft 172 of a differential transmission which is generally designated by the reference numeral 173. This transmission has an output shaft 174 on which a gear 175 is fastened. Differential transmission 173 is involved in modulating the speed of the squeezer conveyor belts as required for assuring that product units will be discharged at exactly the correct time for arriving in phase with the flight conveyor.

By way of example and not limitation, a suitable differential transmission is obtainable from Electronic Machine Parts, Inc., of College Point, N.Y.

Differential transmission 173 has a motor M2 associated with it. When the motor runs, the speed of the output shaft 174 increases relative to constant speed input shaft and the squeezer conveyor runs at high speed. When M2 is stopped, the output shaft 174 speed decreases and the squeezer conveyor runs at its low speed. M2, through intervening circuitry, is controlled by modulating electric eye EE2 in conjunction with first and second cam operated switches LS-3 and LS-2, which are in cam switch box 167 in FIG. 4 as will be discussed later in connection with FIGS. 9 and 10. Generally speaking, each time the trailing edge of a product such as the one marked 56 in FIG. 4 passes eyes EE2, EE2 sees light again and provides a precise position indication of the product. As explained generally earlier, the timer cams 180 and 181 are synchronized with the conveyor as a result of being driven from the common drive shaft and they are arranged to actuate one of the switches LS-2 or LS-3 and effect an appropriate speed correction by driving transmission motor M2. If the first switch LS-3 is closed when EE2 senses light, the product is getting too late for synchronism and the speed of the squeezer conveyor is increased. If the second switch LS-2 is closed when EE2 sees light, the product is too early and the speed of the squeezer conveyor is decreased. As a result, the spatial positions of rolls being discharged from the squeezer conveyor are substantially continuously corrected to arrive in the flight conveyor within the proper time span so the flight bar is behind the group.

Referring further to FIG. 4, output gear 175 of the differential transmission drives another gear 177 through an intervening change gear 178. Change gears are substituted in accordance with the length of a product grouping or the length of individual products.

Gear 177 drives an electromagnetic clutch and brake assembly 159. When the clutch is energized, the brake is off and vice versa as will be explained more fully later in reference to FIG. 9. The power output pulley 179 has a belt 188 that drives squeezer conveyor pulleys 39 and 42 when the clutch is energized. Belt 188 also runs over an idler pulley 189 which is mounted on means, not shown, which enables adjusting belt tension.

The use of timing belts having surface teeth or cogs engageable in toothed pulleys assures that there will be no slippage so all operating parts in the infeed conveyor system will remain in synchronism.

In respect to alternative elements in the above described system, it may be noted that instead of only using a three gear epicyclic motion to speed product up without gaps in a single group, a slider and crank or other appropriate motion mechanism could be used. For squeezer belt modulation, a differential unit could be used to change average belt speed or a package of two electric clutches per lane could be used, or one electric clutch per lane and one over-running clutch per lane could be used. Instead of a flight conveyor being the last element in the system, it could be replaced with a pocketed wheel or other timed conveying device.

Earlier it was mentioned that the transition conveyor belts 51 and 54 are running at a cyclically variable speed in the described embodiment. This is true only for situations where more than one product roll is grouped end-to-end from each lane, the transition conveyor belts 51 and 54 are required to have varying speed characteristics. For handling other products such as single and two roll towels coming from single or adjacent lanes and not end-to-end, variable speed transition belts are not required. Two roll bathroom tissue coming from individual lanes in side by side relationship do not require use of variable speed transition belts. When grouping is not needed as just described, the transition belts may be run at constant speed which may be any speed faster than the squeezer conveyor up to a speed equal to the speedup belt 60. Epicyclic gear systems are used in this example to enable this adjustment.

Figure 6:
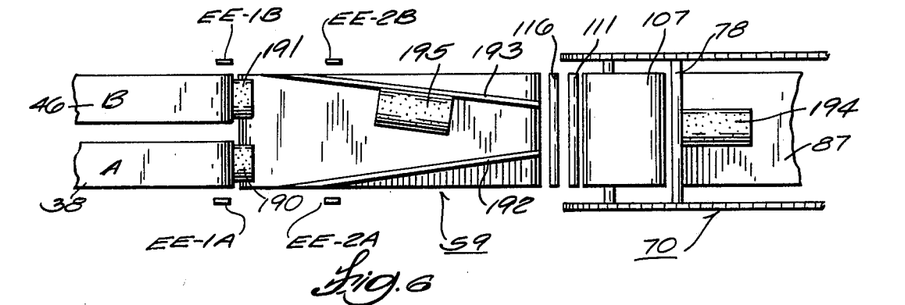
FIG. 6 is a plan view of a modified form of the infeed conveyor system.
Figure 7:
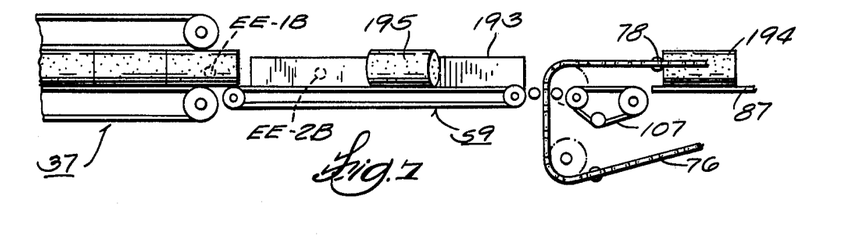
FIG. 7 is a side elevational view of the apparatus shown in FIG. 6.

An alternative form of the invention is illustrated in FIGS. 6 and 7. In these figures, parts which correspond with those in the embodiment previously described in reference to FIGS. 1-5 are given the same reference numerals.

FIG. 6 is a two lane embodiment and is particularly suitable for separating paper towel rolls which are substantially longer than bathroom tissue paper rolls. In this embodiment, electric eyes EE1 and EE2 are shown and EE3 is not shown but is understood to be present. There are two adjacent and generally parallel squeezer roll assemblies whose upper belts are again marked 38 for lane A and 46 for lane B. It will be understood that the squeezer belts are occupied over their entire lengths by towel rolls. The lead towel in lane A is marked 190 and the lead towel in lane B is marked 191. A single speedup conveyor 59 is used. A pair of guide walls 192 and 193 are disposed over the speedup conveyor to provide a converging passageway. This passageway directs products such as those marked 194 and 195 into the flight conveyor 70.

In the FIGS. 6 and 7 embodiments, the squeezer conveyors are synchronized for discharging paper rolls alternately so that one such as 195 is a considerable distance down the conveyor before another such as 190 is discharged from the squeezer conveyor. Consecutive products are properly spaced for arriving in the flight conveyor immediately ahead of consecutive advancing flight bars such as 78. The arrangement permits packaging of ungrouped towel rolls by converging these products alternately from two supply lanes in installations where the product supply comes to the infeed conveyor in two lanes. All the mechanisms are driven from a common power input shaft so they remain in synchronism. The squeezer conveyor belts are modulated to assure that the rolls will arrive at the proper time in the flight conveyor as in the previous cases.

Figure 8:
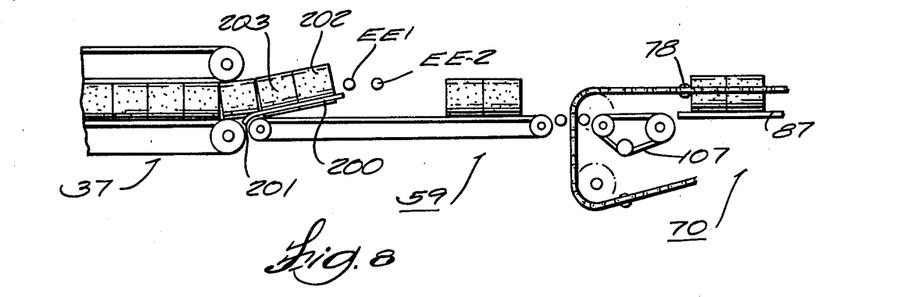
FIG. 8 is an alternative embodiment of the invention.

Another embodiment is shown in FIG. 8. It is adapted for grouping products but it can be used for separating single rolls as well. As shown, it is set for grouping rolls. The transition conveyor 50 is eliminated in this arrangement. A pair of skid rods, one of which, 200, can be seen. The parallel skid rods are pivotal about a horizontal axis 201. Means are provided for causing skid rods to pivot downwardly in response to the lead roll 202 in a pair which includes 203 interrupting the beam to EE1. When this happens, the time is right for depositing the rolls 202 and 203 jointly on speedup conveyor 59. The squeezer conveyors such as 37 in this arrangement are similar to the previous embodiments. The speedup conveyors are modulated in response to the angular positions of the timing cams and the time at which modulating eye EE2 sees light following passage of the rear end of a product group. EE1 is used not only to drop skids 200 but, as in the previous embodiment, it is also used to start product flow at the proper time.

Figure 9:
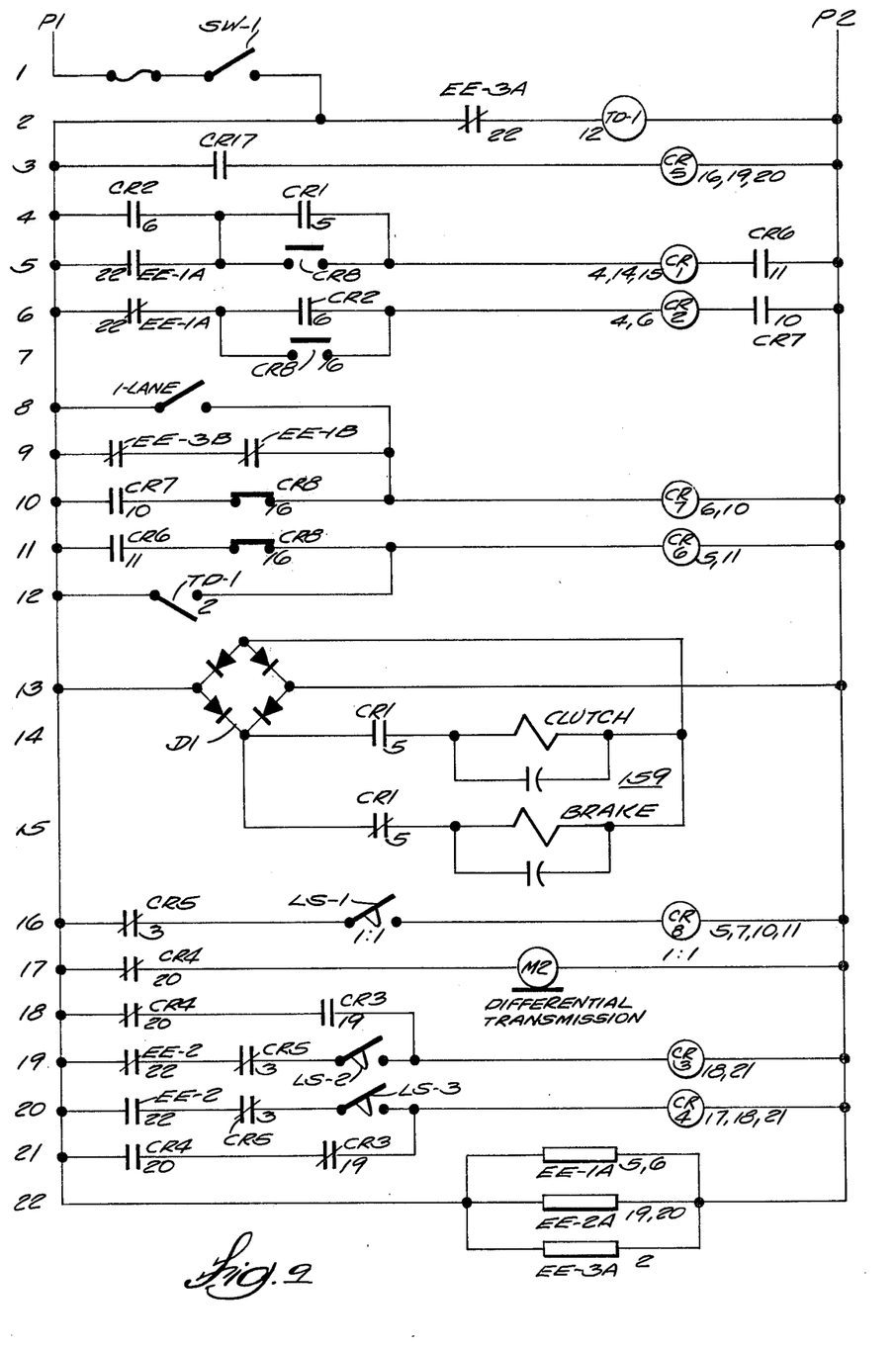
FIG. 9 shows the control circuitry, primarily for a one-lane infeed system, with some of the components shown being used for a two-lane system.

An electric control circuit for exemplifying functional characteristics of the new infeed conveyor system embodiments is shown in FIG. 9. It is based on use of relay logic and electromechanical switches but those skilled in the electrical arts will appreciate that the circuitry can be implemented with semiconductor logic devices and switches too.

In this line diagram, the lines are numbered 1 to 22. All relay operator coils identifiers are prefaced with CR followed by a number and the lines in which their contacts exist are marked adjacent the operator coils. Relay contacts have the same CR number as the relay and the contacts have a number adjacent them which indicates the line in which their operator coils are connected.

Closing switch SS-1 energizes the control system from a-c power lines P1 and P2. L will be used as an abbreviation for the word "line". The FIG. 9 circuit is for controlling the squeezer conveyor in lane A. A substantially similar circuit is used for controlling lane B in a dual feed system. If there is a two lane system, the two control circuits interact as will be explained.

As mentioned in connection with FIG. 4, the squeezer conveyor is started and stopped with an electrically operated clutch and brake assembly 159. Their operating coils are in lines 14 and 15 of the diagram and are supplied from a rectifier bridge D1 through contacts CR1 in L14 and L15. Whenever relay operator coil CR1 in L5 is energized, the squeezer conveyor runs. As soon as CR1 deenergizes, the clutch is disengaged via CR1 in L14 and the brake is applied by closing of CR1 in L15.

All electric eye contacts are shown in FIG. 9 as if rolls or product were in their beams, that is, they are in their dark state. The power circuits for the electric eye devices are in L22.

A relay coil which is involved in assuring that events have a common zero time reference point is CR8 in L16. It is alternately energized and deenergized for every machine cycle through a switch LS-1A in L16. This switch is driven by the cam in cam and switch assembly 167 in FIG. 4. The four contacts controlled by CR8 are in L5, L7, L10 and L11 in FIG. 9.

System starting conditions will be considered first. The squeezer conveyor is assumed to be stopped. When product (rolls) arrive to break the beam of backlog eye, EE3, contact EE3A in L2 closes and energizes time delay relay TD-1 in L2. Thus, TD-1 contact in L12 closes, energizing relay CR6 in L11. Its holding contacts CR6 in L11 will close and the holding circuit is complete when the cam controlled contacts CR8 in L11 close at time zero.

When CR6 energizes, its contact in L5 closes and relay CR1 in L5 can energize if other conditions are met when CR8 in L5 closes at time zero. One condition is when there is product at the squeezer conveyor output end, as is usually the case if the system shut down due to lack of product supply, after it has been in production, so start-up eye EE-1 will be dark and its contact EE-1A in L6 will be closed as shown. Thus, at time zero, CR8 in L7 will have closed and relay CR2 in L6 will energize through CR7 contact in L6. CR7 contact in L6 is jumpered if only single lane A machine is in use. Assume that there is a lane B machine in a ready to operate state in which case its backlog eye EE-3B and its start-up eye EE-1B will be dark and its interlock contacts in L9 of FIG. 9 will be closed, thus enabling CR7, at time zero, which is sustained with its holding contact in L10 at least until CR8 in L10 is opened after time zero. As long as there is product in start-up eye beam EE-1, relay CR2 in L6 will energize.

When CR2 energizes, relay CR1 in L5 can energize through CR2 in L4, CR8 in L5 at time zero, and CR6. CR1 holding contacts in L4 close and CR2 contacts in L4 stay closed to sustain CR1 which started the squeezer conveyor, by operating the clutch coil in L14, the instant it was energized. As long as product flow is continuous, the squeezer conveyor will continue to run and will discharge product to the transition conveyor or whatever ensuing conveyor is used. Since the squeezer conveyor was activated at time zero, the first product will be discharged from it at the exact time for it to be in phase with the flight conveyor when the product arrives there. If the supply of products is continuous they will be delivered from the squeezer conveyor at a fixed rate subject to such corrections in phasing as are imposed by modulation of the squeezer conveyor speed. The squeezer conveyor in lane A will stop automatically, if its product supply becomes exhausted, in response to backlog eye EE3 receiving light. If there is a lane B system, lack of product supply will stop the lane A squeezer conveyor by reason of contacts EE-3B or EE-1B opening in line 9. This deenergizes CR7 when time zero occurs and at that moment relay CR1 will deenergize to stop the squeezer.

The start-up sequence just described assumed that there was product darkening start-up eye EE1 at start-up so the relays operated in the described sequence and synchronous discharge of product from the squeezer conveyor began. During start-up at the beginning of a production run when there is no product darkening the start-up eye EE1 initially but product is available on the supply conveyor, the backlog eye EE3 will see dark and will close its contacts in L2 to start the squeezer conveyor as before. Product will be advanced until start-up eye EE1 is dark. If everything is in synchronism the product will continue. If not, the squeezer conveyor will stop momentarily and will restart at time zero so as to run synchronously. If CR2 contact on line 4 is not closed, considering that EE-1A contact on line 5 opens when product darkens eye EE-1, the belt stops because CR1 would deenergize. Contacts EE-1A in L6 open to disable relay CR2. The first requirement for energizing relay CR2 to thereby start the squeezer belts is for lane B contacts in L9 to close to energize CR7 in L10 and close CR7 contacts in L6, which then energize relay CR2 in L6 when CR8 in L7 closes, and holds relay CR2 in L6 energized through CR2 contact on L6. Energizing CR2 contact in L4 results in energizing relay CR1 to start the squeezer conveyor at the proper time.

The squeezer conveyor will continue to run until any of the following occur: (1) Product flow on the supply conveyor in front of electric eye 3A stops which deenergizes time delay relay TD-1 and opens TD-1 contact on L12. When this occurs, relay CR6 stays energized through CR8 contact on L11 until cammed CR8 in L11 opens momentarily which results in relay CR1 deenergizing to stop the squeezer conveyor belts. This is the proper time for the belts to stop; or (2) Either the backlog eye EE-3B or EE1-B (not shown) in lane B is not darkened by supply product, which opens its contacts in L9. But CR7 stays energized through CR8 contact in L10 until CR8 cam relay contact momentarily deenergizes. This deenergizes relay CR7 in L10 at the proper moment to stop the squeezer conveyor belts which accomplishes this by opening CR7 contact on L6, deenergizing CR2, which opens CR2 contact on L4 which deenergizes CR1 to stop the squeezer conveyor belts.

The squeezer conveyor will stay stopped until either of the following occurs: (1) If it was lack of product in lane A which caused the squeezer conveyor to stop, and if lane B is supplied with product, resumption of product closes EE-3A contacts in L2 which energizes TD-1 to ultimately energize CR6 when the time delay expires. Then CR6 contact on L5 closes but relay CR1 does not energize until CR8 contact in L5 closes momentarily and completes the circuit through closed CR2 contact. This starts the squeezer conveyor in proper synchronism; or (2) If it was lack of product in lane B which caused the squeezer conveyor to stop and if backlog eye EE3 in lane A does not lack product, CR7 will energize when lane B again has product supplied. This closes CR7 contact in L6 to then energize CR2 in L6 when CR8 in L6 momentarily closes which then closes CR2 contact in L4 to energize CR1 and start the squeezer conveyor in proper synchronism. Note that time delay relay TD-1 is used since if only a few products enter the squeezer belts such as at the start of a run, CR6 on L11 would stay energized until contact CR8 in L11 opens as a result of cam switch LS-1A in L16 opening. This could be as much as two product lengths later which would mean that the trailing product could be several inches into the squeezer belts. Then when product would be supplied again, a gap of that amount would occur in the squeezer conveyor. To solve this, backlog eye EE3 are located a little more than two product lengths back from the input end of the squeezer conveyor belts. Since if no time delay were used, the squeezer conveyor would start immediately when backlog eyes EE3 are darkened again, leaving a gap of up to two product lengths, but TD-1 insures that newly supplied product touches the back or trailing product already at least partly in the squeezer conveyor before the conveyor belts start again.

The manner in which the squeezer conveyor speed is modulated between high and low speeds for the purpose of compensating any errors that would ultimately result in loss of synchronism between the squeezer and flight conveyor will now be described in further reference to FIGS. 9 and 10. Recall that modulation is achieved by turning on and off motor M2 on differential transmission 173 in FIG. 4.

The elements involved in modulation appear in lines (L) 17, 18, 19, 20 and 21 in FIG. 9. Cam operated switch LS-2A and LS-3A which appear in L19 and L20 were previously mentioned as being located in cam-switch box 167 in FIG. 4. The driving cams for switches LS-2 and LS-3 are marked 180 and 181 in FIG. 10. The notches 184 and 186 of these cams have a constant angle between them since the cams are on the same shaft. The cams each make one revolution per machine or main shaft cycle and they run continuously. The pairs of cams are shown in FIG. 10 in states A to F to enable explaining their action and that of their respective switches LS-2 and LS-3 in connection with changing the squeezer conveyor between low and high speed, the difference being about 5% in this machine. Modulation eye EE2 is also shown in FIG. 10 as is the product in various positions on speedup conveyor 59.

The circuit elements in FIG. 9 will assume various states depending on whether the product is too far ahead of the beam to EE2 or too far behind it and the states of cam switches LS-2 and LS-3 at the time.

When relay CR3 in L19 of FIG. 9 is deenergized, differential transmission motor M2 is turned off and the squeezer conveyor belts run at the low speed. When CR4 in L20 is deenergized, M2 is on and the squeezer conveyor runs at the high speed.

If the product is not out of the EE2 beam by the time LS-2 closes, the product is too far behind schedule and switching takes place which results in the squeezer conveyor going from low to high speed.

If the product is out of the EE2 beam when LS-3 closes, the product is too far ahead of schedule and switching takes place which results in the squeezer conveyor going back to low speed.

Thus, if the timing cams are set with a smaller angle between their LS-3 and LS-2 operating position, the permissible product position error or tolerance will be small. If the angle and, hence, the operating time difference were made larger, a larger error or tolerance could occur before the squeezer conveyor speed would be changed.

The description of the squeezer conveyor modulation function assumes that initially there is no product at all crossing the beam path in FIG. 10. Modulation eye EE2 will then see light all the time in which case its contact EE2 in L20 will be closed. At the first time zero after starting the machine, LS-3 in L2 will close momentarily and energize relay CR4 in L20. Holding contact CR4 in L21 will close and since contact CR3 in L21 is closed due to relay CR3 in L19 being deenergized, relay CR4 will lock in. Relay CR3 cannot energize even though cam switch LS-2 closes a short time after time zero because contact EE2 in L19 is open when modulation eye EE2 sees light. With relay CR4 energized, contact CR4 in L17 is open and motor M2 is off. When M2 is off, the squeezer belt runs at low speed.

The first dynamic modulation condition to be considered is in line A of FIG. 10 where product is being transported by the squeezer conveyor but has fallen back by a minor amount and is in the beam when the first cam operated switch LS-3 closes. Relay CR4 is energized already as stated in the preceding paragraph, through its holding contact CR4 in L21 and closed contact CR3 in L21 which is closed because CR3 is deenergized. As stated, when CR3 is deenergized and CR4 in L20 is energized, contact CR4 is L17 is open and M2 is off, causing the squeezer conveyor to continue at low speed. In this condition, it is assumed that product is out of the EE2 beam by the time LS-2 cam switch closes in which case CR3 still cannot energize to cause a speed change because contact EE2 in L19 is open when the product leaves the beam.

The second condition pertains to line B where the product is advanced but within tolerance and modulation eye EE2 sees light. Since neither LS-2 or LS-3 is closed at this time, the product is not too early so CR3 in L19 cannot energize yet. M2 remains off and the squeezer conveyor remains at low speed. Contact EE2 in L19 is open at this moment as is LS-2 in L19 to account for CR3 not energizing. CR4 remains energized through its closed holding contacts CR3 and CR4 in L21. With CR4 energized, the CR4 contact in L17 is open and M2 is deenergized.

In line C of FIG. 10, the product is late significantly in its transit so eye EE2 is dark at a time when LS-2 is closed. With EE2 dark, its EE2 contact in L19 is closed when LS-2 is closed so relay CR3 in L19 energizes. It stays energized through now closed holding contacts CR3 and CR4 in L18. CR4 has now deenergized because its holding contact CR3 in L21 opened when CR3 in L19 energized. With CR4 in L20 now deenergized, its CR4 contact in L17 closes and M2 turns on, resulting in the squeezer conveyor switching to its high speed in order to keep the product position within tolerance.

In line D of FIG. 10, the product is gaining because of the now high speed operation but is within tolerance. Eye EE2 sees light while second switch LS-2 is closed. Although EE2 contact in L20 closed when EE2 sees light, LS-3 is open at the moment so CR4 remains deenergized and CR3 in L19 remains energized and locked in so M2 stays on and the squeezer conveyor continues at high speed.

In line E of FIG. 10, the product is still advanced and may be about to go out of tolerance since the squeezer conveyor is still at high speed. No change of state of either relay CR3 in L19 or CR4 in L20 is closed when LS-3 cannot energize because LS-3 and LS-2 are open at the same time.

In line F of FIG. 10, the product is now so far ahead that LS-3 is in low cam and closed. EE2 sees light at this time, and its EE2 contact in L20 is closed when LS-3 closes. This energizes relay CR4 in L20 and CR4 contact in L17 opens, turning off M2 and the squeezer conveyor switches to its low speed mode again.

Figure 11:
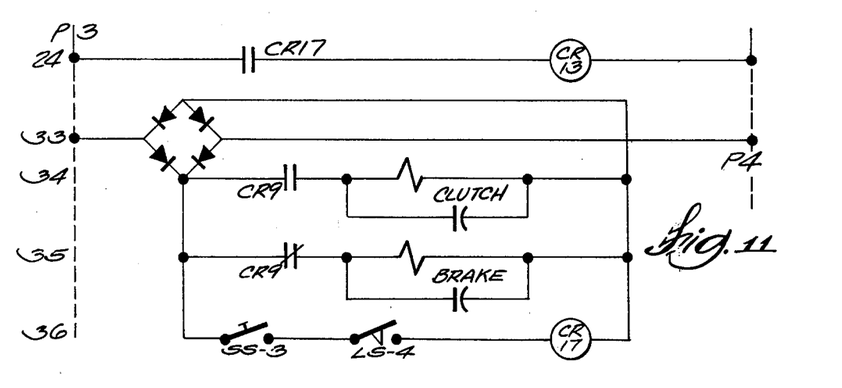
FIG. 11 is a control circuit diagram as modified for releasing products alternately from adjacent squeezer conveyors.

Operation of two lanes A and B alternately for feeding a single flight conveyor will now be discussed briefly. If lane B is used, its control circuit will be substantially like the one in FIG. 9 for lane A. So much of the lane B control circuit as is necessary to describe alternate lane operation is shown in FIG. 11.

Consider a two lane system such as in FIG. 6. Assume that single roll product is being run such as HHT which is about twice as long as BRT. The product is supplied to the infeed conveyor from a log saw, not shown. The infeed conveyor must combine the two lanes of product into a single lane and put one product in each flight conveyor 70 pocket at the output end of the infeed conveyor. Assume a product length of about 11 inches as an example.

The modulated squeezer conveyor belts are set to move $5\frac{1}{2}$ inches nominally per cycle of the packaging machine. This will give 11 inches movement every two cycles or two products per two cycles, since lane A and lane B would each move 11 inches per two cycles, or one product per $5\frac{1}{2}$ inches of squeezer belt movement or one product out per cycle.

A requirement is to get the lane A and lane B electric controls to cause alternate operation so that one product 195 comes out of alternate lanes every machine cycle. The first product must come out of lane A on cycle 1, the second product out of lane B on cycle 2, and so on.

The components for accomplishing this are shown in the depicted part of the lane B control.

On line 36 there is a selector switch SS-3 which is closed for operating in the alternate lane mode as opposed to parallel lanes and single lane modes. In line 36, there is a cam operated switch LS-4, which operates in a 1:1 relationship with the main drive shaft, and there is a control relay CR17 which is an alternate impulse relay. When SS-3 is closed manually and the machine is started, every time LS-4 drops into low cam CR17 in L36 energizes. The first energization of CR17 causes CR17 contacts on L3 (FIG. 9) to close and those in line 24 of FIG. 11 to open. The next or second energization of CR7 closes the CR17 contacts on L24 and opens those on L3. When it energizes the third time, the first time conditions are restored.

Alternate impulse relays such as CR17 have only one set of contacts on each side so it is necessary to energize its own relay which has multiple contacts. These relays are CR5 in L3 of FIG. 9 and CR13 in L24, FIG. 11. Further discussion will concern lane A which is typical of both lane controls.

The CR5 relay in L3 has three sets of contacts which are normally closed when deenergized in L16, L19 and L20. Typical contacts CR5 in L16 are always closed when SS-3 in L36 is open for running parallel lanes since CR17 in L36 is always deenergized and CR5 in L3 would also always be deenergized. Hence, the CR5 contacts in L16 are always closed.

When SS-3 is closed for the alternate lane mode, CR5 in L3 energizes for one cycle and deenergizes on the next cycle. Since in L16, CR8 only energizes when CR5 contacts close and LS-1A closes momentarily, it is apparent that for CR8 to energize every other cycle, CR5 contact must close on the first cycle, thereby energizing relay CR8 momentarily when LS-1A closes and then keeping the CR5 contact in L16 open during the entire next cycle. This means that even though LS-1A will close, CR8 relay in L16 cannot energize since L16 is open at the CR5 contacts. The process is the same at CR5 contacts in L19 and L20 and on the entire lane B side in corresponding contacts. The clutch and brake for the lane B squeezer conveyor are in L34 and L35 of FIG. 11. They are controlled by contacts CR9 in the same lines. The CR9 relay coil for lane B is not shown but corresponds with CR1 relay in L5 of FIG. 9.

In this way, all of the timer cams for lane A operate or are effective on one cycle and all cams for lane B operate on the next cycle. This allows release of product out of the infeed conveyors alternately and to have the products arrive in phase with successive flight conveyor pockets.

Although embodiments of the invention have been described in detail, such description is intended to be illustrative rather than limiting, for the invention may be variously embodied and is to be limited only by construing the claims which follow.

I claim:

1. A conveyor system to supply paper rolls and like articles in synchronized sequence to a subsequent device at high speed, and capable of handling rolls of tissue and the like, comprising a low friction belt supply conveyor, a high friction belt squeezer conveyor having a lower belt and an upper belt arranged to receive products between said high friction belts, said squeezer conveyor having drive means to drive it at a first speed a little above the required average speed, and at a second speed a little below the required average speed, and first control means to switch said drive means from one said speed to the other in response to a timing signal derived from product position, a speedup conveyor operating at an average speed greater than the speed of the squeezer conveyor, a flight conveyor operating over a low friction stationary bed to deliver articles at high speed in exact synchronization to a subsequent device, and in which a backlog sensor senses the presence of conveyed articles at a location on the supply conveyor and initiates a signal enabling the squeezer conveyor to run only when conveyed articles are sensed at said location.

2. The device of claim 1 in which a backlog sensor senses the presence of conveyed articles at a location on the supply conveyor and supples a signal enabling the conveyor system to run if conveyed articles are present, but not otherwise.

3. The device of claim 1 in which a flow start sensor senses the presence of conveyed articles past the end of the squeezer conveyor, and means activating said flow start sensor in synchronism with a flight of said flight conveyor, said flow start sensor supplying a signal to actuate a part of said conveyor system to allow conveyed articles to progress on said conveyor system when said articles are present at said flow start sensor and are synchronized with said flight.

4. The device of claim 3 in which said squeezer conveyor is followed by a pair of parallel article support rods arranged to receive articles from the squeezer conveyor successively, said flow start sensor being located to send said signal when successive articles fill said rods, said signal actuating a means to lower said rods to place the articles from the rod on the belt of the speedup conveyor.

5. The device of claim 1 in which said squeezer conveyor feeds a transition conveyor driven continuously at a speed which varies from a lowest speed slower than the speed of the squeezer conveyor to a highest speed faster than the speed of the speedup conveyor with the average of all speeds during a cycle being between the squeezer conveyor speed and the speedup conveyor speed, and said transition conveyor feeds said speedup conveyor, the speed variations being so timed with respect to feed from the squeezer conveyor that a product moves from the squeezer conveyor to the transition conveyor when the transition conveyor speed is higher than the squeezer conveyor speed and another product moves from the squeezer conveyor to the transition conveyor when the transition conveyor speed is slower than the squeezer conveyor speed to form a product group on the transition conveyor, said product group being transferred to said speedup conveyor in abutting relationship at a higher speed.

6. The device of claim 5 in which the transition conveyor includes upper and lower belts driven by an epicyclic gear train with gears changeable to adjust the ratio between the speeds.

7. The device of claim 5 in which the conveyors are all substantially at one level, and extend in a single direction.

8. The device of claim 5 in which a flow start sensor senses the presence of conveyed articles past the end of the squeezer conveyor, and means activating said flow start sensor in synchronism with a flight of said flight conveyor, said flow start sensor supplying a signal to actuate a part of said conveyor system to allow conveyed articles to progress on said conveyor system when said articles are present at said flow start sensor and are synchronized with said flight.

9. An infeed conveyor system for transferring products such as paper rolls from a supply of products for arrival in synchronism with a moving product receiver, comprising:
  a squeezer conveyor including belts arranged to define a passage having inlet and outlet ends, translation of said belts causing product engaged between them to translate from said inlet end to said outlet end for discharge into a path of travel,
  drive means for translating said belts between low and high speeds below and above the average speed required to obtain said synchronism,
  means for detecting the position, within a predetermined time period, of products discharged into said path, and
  control means responsive to said detecting means by controlling said drive means to set the speed of said belt means depending on the position in which said product is detected.

10. The system as in claim 9 including:
  a speedup conveyor along said path including translatable belt means for receiving and continuing transport of said products, said speedup conveyor belt means being translated at an average speed greater than the speed of said squeezer conveyor.

11. The system as in claim 9 including:
  a supply conveyor comprising translatable low friction belt means for supplying products adjacent said inlet end of said squeezer conveyor, backlog detector means for detecting the presence or absence of supplied products adjacent said inlet end, and means responsive to the absence of product being detected by stopping said squeezer conveyor and to the presence of product by enabling said conveyor to run.

12. The system as in claim 9 including:

flow-start detector means for detecting the presence or absence of product at said outlet end of said squeezer conveyor when start-up of product flow through said squeezer conveyor is desired, timer means for determining the time at which a product must be discharged from said squeezer conveyor to arrive in synchronism with said receiver means, and means responsive to said flow-start detector detecting the presence of product and to simultaneous determination of said time by said timer means by starting said squeezer conveyor drive means to cause said squeezer conveyor means to discharge the product.

13. The system as in claim 9, adapted for grouping products discharged from said squeezer conveyor, including:

transition conveyor means including belts arranged to define a passage for transporting products and having inlet and outlet ends, said inlet end being arranged adjacent the outlet end of the squeezer conveyor, drive means for translating said transition conveyor belts at cyclical high and low speeds, said drive means being constructed and arranged for translating said transition conveyor belt at a higher speed when the first in two consecutive products is being discharged from said squeezer conveyor and at a lower speed when the next product is discharged from said conveyor.

14. The system as in claim 9 adapted for grouping products discharged from said squeezer conveyor, including:

product support means extending along said path adjacent the outlet end of said squeezer conveyor for receiving products discharged consecutively from said squeezer conveyor means and being movable between a first position for receiving products from said squeezer conveyor and a second position for releasing said products, detector means for controlling said support means to move cyclically from its first position in response to detection of a plurality of products on said support means to its second position for releasing said products, and speedup conveyor means for accepting said plurality of products released from said support means and for further transporting them toward said receiver means.

15. The system as in claim 14 wherein:

said support means comprises a pair of spaced apart pivotally mounted rods extending for supporting said products between them, said rods pivoting in response to said plurality of products having been accumulated and detected.

16. An infeed conveyor system for transferring products, such as paper rolls, from first and second supplies of products for successive arrival in synchronism with a moving product receiver, comprising:

squeezer conveyors adjacent each other in individual lanes and each having a pair of belts arranged to define a passage having inlet and outlet ends, translation of said belts of each squeezer conveyor means causing product engaged between them to translate from said inlet to said outlet ends, individual drive means for translating said squeezer conveyor belts respectively between low and high speeds below and above the nominal speed required to obtain said synchronism, speedup conveyor means for receiving products alternately discharged from the squeezer belts in each of said lanes and for advancing said products toward said receiver means in series, means associated with each lane for detecting the position, within predetermined time periods, of products on said speedup conveyor means which products are discharged from each lane, individual control means responsive to the respective detecting means by controlling said drive means to set the speed of said squeezer belt means depending on the position in which said products are detected, said drive means controlling said squeezer conveyor belt speeds, respectively, for advancing said products in each of them at a nominal speed which corresponds with their being advanced alternately about one-half of a product length for each machine cycle.

17. An infeed conveyor system comprising:

a supply conveyor having a translating belt with a low friction surface on which a supply of products, such as paper rolls, are delivered, a receiver conveyor spaced from said supply conveyor and having constantly movable means for receiving products provided from said supply, a squeezer conveyor having translatable relatively higher friction belts, said belts defining a passage between them having an input end adjacent said supply conveyor and an output end, translation of said belts causing product engaged between them to translate from said inlet to outlet end for release from said squeezer conveyor, a speedup conveyor constructed and arranged to receive product released from said squeezer conveyor and to advance said product toward said receiver conveyor, a common source of power for driving said receiver, squeezer and speedup conveyors, drive means operatively coupling said common source of power to the speedup and receiver conveyors, respectively, to drive them at a substantially constant speed, squeezer conveyor drive means operatively coupling said common power souce to said squeezer conveyor for translating said belts and including means which are switchable between states to cause said squeezer conveyor to run at low and high speeds, respectively, below and above the average speed required for products released from said conveyor to arrive in synchronism with said receiver conveyor means, said drive means also including clutch means operable to couple and decouple said squeezer conveyor means and said power source, first and second cams controlled to rotate at a constant angular speed and to be in an identical angular position at the same time in each cycle of the system, said cams each having switch operating means with a fixed angle between them, first and second switches each of which is closed and opened successively by said rotating switch operating means, means for projecting a beam of light across the path along which said product travels after release from said squeezer conveyor, detector means for detecting said light beam, means for controlling said switchable means to change states, said means for controlling responding to said detector not sensing light due to product interrupting said beam concurrently with closure of said first switch by maintaining said switchable means in a state that will cause said squeezer conveyor to run at low speed corresponding with said product not being too late, said means for controlling responding to said detector not sensing light due to product interrupting said beam concurrently with closure of said second switch by switching said switchable means to a state that will cause said squeezer conveyor to run at high speed corresponding with said product being too late, and said means for controlling responding to said detector not sensing light due to product interrupting said beam concurrently with closure of said first switch by switching said switchable means to a state that will cause said squeezer conveyor to run at low speed since said product would be too early.

18. The system as in claim 17 wherein:

said switchable means in said squeezer conveyor drive means comprises a differential power transmission means having a power input shaft coupled with said common source of power and a power output shaft coupled with said conveyor, said controlling means comprising a motor for controlling said power transmission means, deenergization of said motor causing the speed of said output shaft to be at low speed for said squeezer conveyor to run at low speed and energization of said motor causing said output shaft to be at higher speed for said squeezer conveyor to run at high speed.

19. The system as in claim 17 including:

first means operative to couple and uncouple said clutch to start and stop driving of said squeezer conveyor, means for determining evenly spaced time reference points for controlling synchronism of said system, said time reference points marking the start of each system cycle, said receiver conveyor being in a predetermined position upon occurrence of each reference point, flow-start light-detector means for detecting the presence and absence of product at the outlet end of said squeezer conveyor, product backlog light-detector means for detecting the presence and absence of product on said supply conveyor at more than one product length away from the inlet of said squeezer conveyor, means responding to said backlog light detector means detecting product followed by a short time delay by controlling said first means to operate said clutch and start said squeezer conveyor to advance a column of products from said supply, means responsive to said flow-start light detector detecting product at said outlet end concurrently with the occurrence of a time reference by causing said first means to maintain coupling of said clutch and responsive to said detector detecting product out of coincidence with a time reference point occurs by causing said first means to uncouple said clutch until occurrence of the next time reference point, and means for causing said first means to uncouple said clutch and stop said squeezer conveyor while its inlet end is still occupied by product in response to said backlog detector detecting exhaustion of said supply.

20. The system as in claim 17 including:

a transition conveyor comprising translating spaced apart belts for receiving products released from said squeezer conveyor output end and for transporting said products to said speedup conveyor, means for driving said transition conveyor from said common power source, and means included in said driving means for cyclically increasing and decreasing the speed of said conveyor to thereby group products released from said conveyor.

21. The system as in claim 20 wherein said means for increasing and decreasing the speed is an epicyclic drive means having input shaft means coupled with said power source and output shaft means coupled to said conveyor.

22. A first infeed conveyor system as in claim 17 operative in conjunction with a second system comprising:

a second supply conveyor and a second squeezer conveyor each of which has the properties of their corresponding first supply and squeezer conveyors, said second squeezer conveyor being arranged for releasing product to said speedup conveyor, and means for controlling said respective squeezer conveyor drive means for repeated alternate release of products from one and then the other of said squeezer conveyors.

23. A first infeed conveyor system as in claim 17 operative in conjunction with a second system comprising:

a second supply conveyor and a second squeezer conveyor each of which has the properties of their corresponding first supply and squeezer conveyors, said second squeezer conveyor being arranged for releasing product to said speedup conveyor, and means for controlling said respective squeezer conveyor drive means to release product simultaneously onto said speedup conveyor.

* * * * *

UNITED STATES PATENT AND TRADEMARK OFFICE
CERTIFICATE OF CORRECTION

PATENT NO. : 4,360,098
DATED : November 23, 1982
INVENTOR(S) : John E. Nordstrom It is certified that error appears in the above-identified patent and that said Letters Patent is hereby corrected as shown below:

On the title page assignee should read:

-- (73) Assignee: Omega Mfg. Corporation, Two Rivers, Wisc. --.

Signed and Sealed this

Twenty-third Day of April 1985

[SEAL]

Attest:

DONALD J. QUIGG

Attesting Officer     Acting Commissioner of Patents and Trademarks